Patented Nov. 6, 1928.

1,690,128

UNITED STATES PATENT OFFICE.

RICHARD PASTERNACK, OF BROOKLYN, NEW YORK, ASSIGNOR TO CHARLES PFIZER & COMPANY, OF BROOKLYN, NEW YORK, A CORPORATION OF NEW JERSEY.

PROCESS FOR PREPARING CINCHOPHEN.

No Drawing.   Application filed April 21, 1927.   Serial No. 185,669.

This invention relates to process for the manufacture of 2-phenyl-cinchoninic acid, commonly known as "Cinchophen", and has for its object to obtain a better yield than is now obtained in the Doebner process, thereby diminishing side reactions tending to produce objectionable products.

Doebner et al. (Annalen der Chemie, 242, p. 290, 1887) purport to obtain cinchophen by dissolving equal molecules of pyruvic acid and benzaldehyde in absolute alcohol and adding 1 molecule of aniline dissolved in alcohol. The heat of reaction considerably raises the temperature and the mixture is then heated on a water bath for three hours. In U. S. Patent 1,075,171, dated October 7, 1916, cinchophen is made by gradually adding pyroracemic (pyruvic) acid to a boiling alcoholic solution of benzaldehyde aniline, which is basically the Doebner reaction and tends to produce some objectionable side products.

I have studied the Doebner reaction and have found that the most favorable conditions for the formation of cinchophen and the suppression of side reactions tending to produce substances such as diketo-pyrrolidine anil are obtained when aniline, benzaldehyde, and an aqueous solution of pyruvic acid are simultaneously run into boiling alcohol. Under such conditions, the formation of diketo-pyrrolidine anil is reduced to an insignificant amount and an increased yield of cinchophen obtained. Without intending to limit myself thereby, I believe that in the Doebner reaction there proceeds simultaneously with the formation of cinchophen one or more side reactions tending to form the pyrrolidine anil above mentioned. I have further found that by the process above mentioned, these side reactions are materially suppressed and the formation of pyrrolidine anil above mentioned becomes insignificant. In the Doebner process a primary product, $\gamma$-anilino-$\alpha$-keto-phenyl-butyric-acid is first formed. The reaction is as follows:

$C_6H_5NH_2$ + $C_6H_5.CHO$ + $CH_3.CO.COOH$ ⟶
aniline   benzaldehyde   pyruvic acid

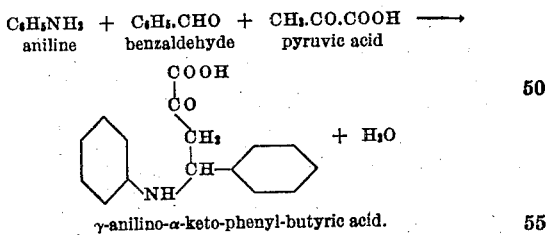

$\gamma$-anilino-$\alpha$-keto-phenyl-butyric acid.

This can be either converted, depending upon the reaction conditions, to a diketo-pyrrolidine or its anil, or to cinchophen.

The reaction in which the anil is formed is:—

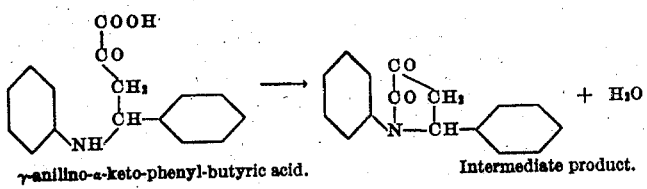

$\gamma$-anilino-$\alpha$-keto-phenyl-butyric acid.     Intermediate product.

The intermediate product reacts with a second molecule of aniline to form the anil,

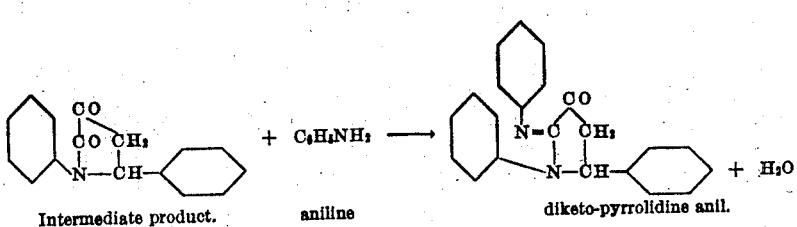

Intermediate product.   aniline   diketo-pyrrolidine anil.

The cinchophen is formed by splitting off of water to form an open chain unsaturated compound, and then by auto-oxidation and reduction of 2 molecules of the latter so that 1 molecule is converted into cinchophen (the oxidized part) and the other (the reduced part) undergoing further unknown secondary changes resulting in gummy by-products. This reaction is as follows:

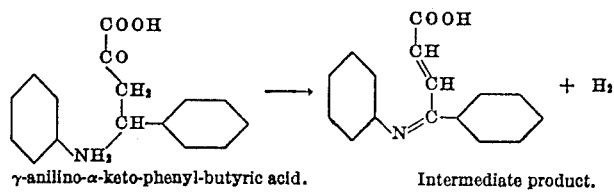
γ-anilino-α-keto-phenyl-butyric acid.   Intermediate product.

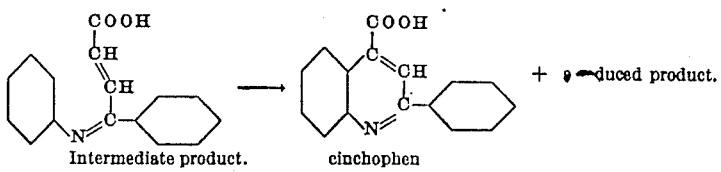
Intermediate product.   cinchophen

The reduced product undergoes a number of secondary changes, which are unknown, and result in gummy by-products whose formulas are unknown.

In my preferred process, I provide 293 parts of 30% aqueous solution of pyruvic acid, and run this together with 93 parts of anilin and 106 parts of benzaldehyde simultaneously into sufficient boiling 95% alcohol to hold the materials in solution. 1500 or more parts of alcohol will be sufficient. The preferred condition is where the pressure is such as to give a temperature of about 100° C. If oxygen is also supplied a still better yield is obtained. The parts given are approximately molecular weights. After further heating, the cinchophen separates out and is recovered and purified in desired manner. Where the pyruvic acid is contaminated with pyrotartaric acid, sufficient excess of anilin is used to neutralize it.

By this process the yield is increased 20% or more, and less anil formed.

I claim:

Process of preparing cinchophen consisting in simultaneously adding substantially molecular proportions of anilin, 30% aqueous solution of pyruvic acid, and benzaldehyde to boiling alcohol at about 100° C.

Signed at 11 Bartett St., Brooklyn, in the county of Kings and State of New York this 19th day of April A. D. 1927.

RICHARD PASTERNACK.